(No Model.) 2 Sheets—Sheet 1.
G. F. BURKHARDT.
APPARATUS FOR DRYING MALT.
No. 255,769. Patented Apr. 4, 1882.
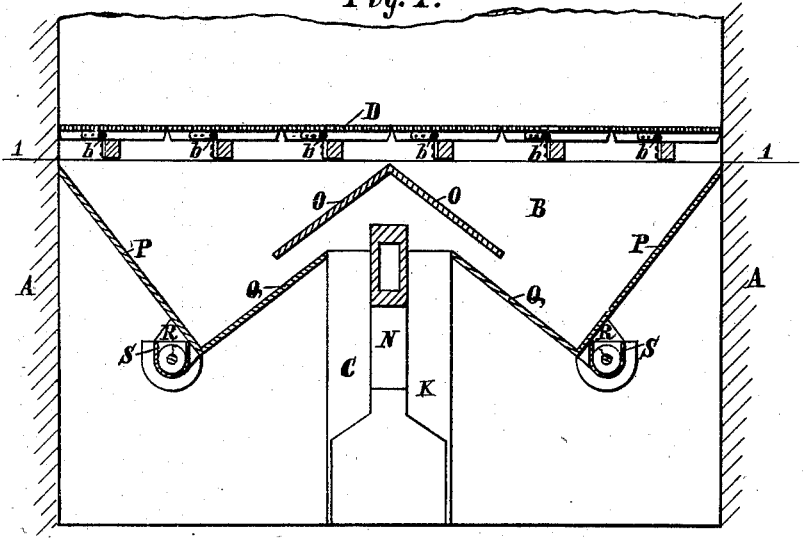
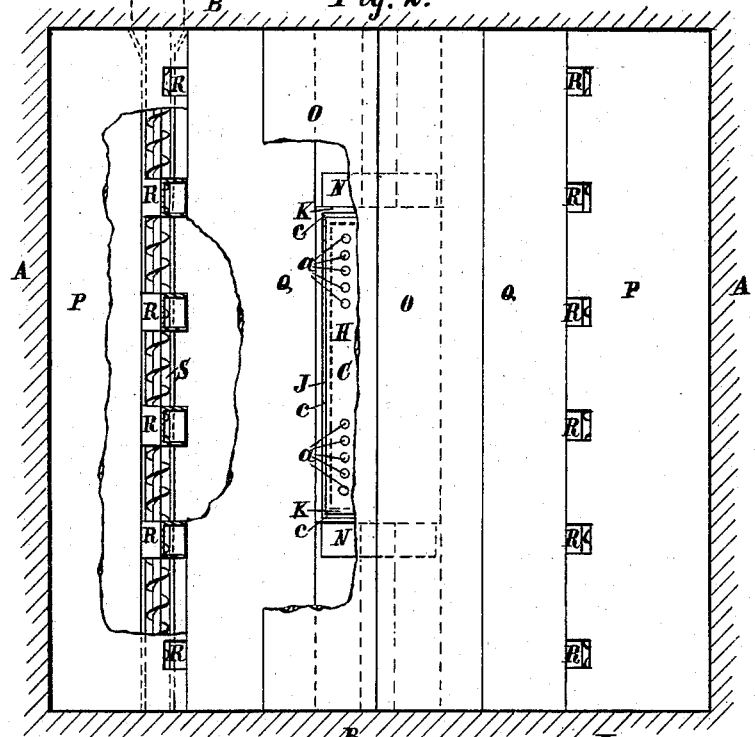
Attest:
Chas. H. Guild,
W. H. Solomon.
Inventor:
Gottlieb F. Burkhardt,
per Edw. Dummer, Atty.

(No Model.) 2 Sheets—Sheet 2.

G. F. BURKHARDT.
APPARATUS FOR DRYING MALT.

No. 255,769. Patented Apr. 4, 1882.

Attest:
Charles H. Guild,
W. H. Solomon.

Inventor:
Gottlieb F. Burkhardt,
per Edw. Dummer,
Atty.

UNITED STATES PATENT OFFICE.

GOTTLIEB F. BURKHARDT, OF BOSTON, MASSACHUSETTS.

APPARATUS FOR DRYING MALT.

SPECIFICATION forming part of Letters Patent No. 255,769, dated April 4, 1882.

Application filed December 12, 1881. (No model.)

*To all whom it may concern:*

Be it known that I, GOTTLIEB F. BURKHARDT, a citizen of the United States, residing at Boston, in the county of Suffolk and State of Massachusetts, have invented a new and useful Apparatus for Drying Malt, of which the following is a specification, reference being had to the accompanying drawings.

My invention relates to apparatus for drying malt; and it consists in the construction and arrangement and combination of parts, as hereinafter set forth, whereby the smoke and gases from the fire in the furnace are caused to pass through one or more flues in which are vertical tubes, through which air passes to be heated, and whereby by means of deflectors the heated air is diffused through the drying-chamber, the deflecting-plates serving, in connection with other inclined plates and troughs, to collect the cured malt dumped on the plates from the drying-floor, to be carried away by conveyers.

Figure 3:
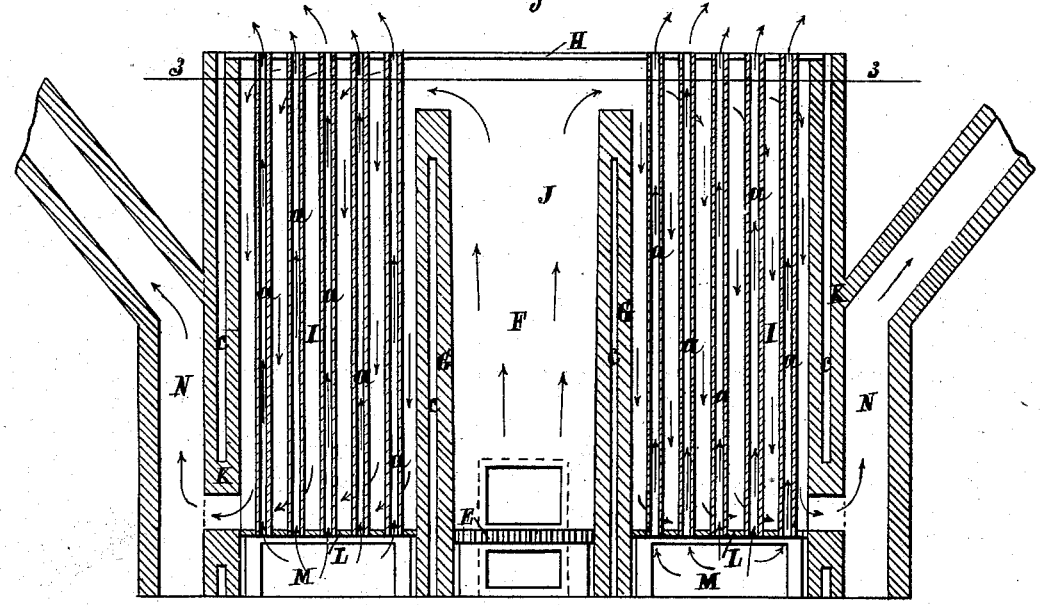
Figure 4:
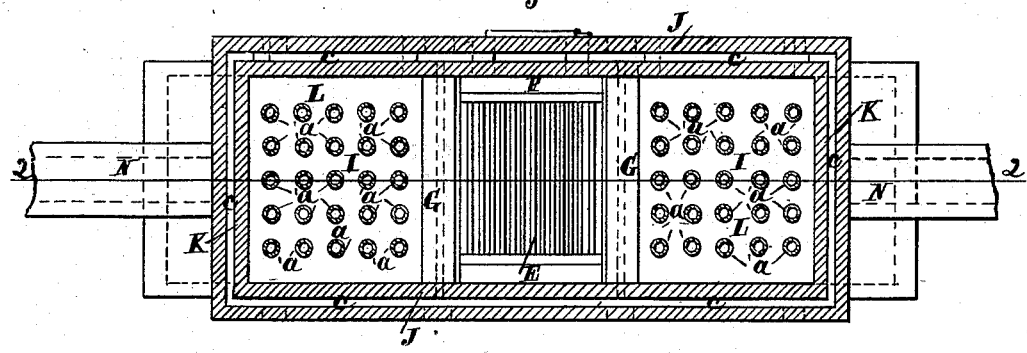

In the drawings, (two sheets,) Figure 1 is a vertical section of outer walls, deflectors, inclined plates, and parts connected therewith, and shows the furnace in position relative to other parts of the apparatus. Fig. 2 is a plan view taken below line 1 1 in Fig. 1, a part of one of the deflectors and of two of the inclined plates being broken away. Fig. 3 is a vertical section of the furnace, taken on line 2 2 in Fig. 4; and Fig. 4 is a plan view taken below line 3 3 in Fig. 3. Figs. 3 and 4 are drawn on a larger scale than Figs. 1 and 2.

The vertical walls A A B B inclose the whole apparatus. In or near the middle of this inclosure is the furnace C. At a suitable distance above the furnace is the perforated floor D, on which the malt to be dried is spread.

The furnace has a grate, E, and a vertical combustion-chamber, F, extending above the grate. The walls G G, forming two sides of the combustion-chamber F, extend up to such height as to leave a space between the top of each wall G and the plate H, said plate H being the top or cap of the furnace. A vertical flue, I, is formed at each of two sides of the combustion-chamber F by the walls G, J J, and K.

At a suitable distance above the bottom of each of the flues I I is a plate, L. Tubes *a* extend from each of the plates L to the plate H, opening into the space below a plate L, and into the space above the furnace. In a wall J are openings M, leading from the space outside the furnace to the spaces below the plates L. A flue or pipe, N, leads from each flue I, just above a plate L, to the chimney or chimneys.

Above the furnace are two deflectors, O O, located, inclined, and joined as shown. At each of two opposite sides of the space inclosed by the outer walls is a plate, P, inclined and joined to the walls, as shown. From the upper edge of each end of the furnace an inclined plate, Q, extends to the lower edge of a plate, P, so that a plate P and a plate Q form a V-shaped trough. From each of these troughs spouts R lead to a trough, S. These troughs S extend across from one wall B nearly or quite to the other wall B, there being openings in one of the walls B, through which the troughs S extend or to which they lead. Each trough S has a screw-conveyer suitably located therein, and to be driven by suitable mechanism. (Not shown in the drawings.)

The perforated floor D may be so made in sections—each of which being pivoted or hinged, as at *b*—that the malt may be dumped therefrom onto the deflectors O and inclined plates P.

I prefer to have the walls G J K of the furnace double, so as to have air-spaces *c* between the parts thereof, as shown. Such air-spaces may be open at the top of the furnace and have openings at or near the bottom of the furnace to the space outside of the furnace, and thus heat which is taken up by the air circulating through said spaces may be utilized.

The flame or the smoke and other gases from the fire on the grate E will pass up the combustion-chamber F, thence through the openings between the top of the walls G and the plate H, and down the flues I, around the outside of the tubes *a* to the flues or pipes N, and through the latter to the chimney or chimneys. The cold air entering the openings M—which may have doors or slides to regulate the quantity of air admitted—will pass up the tubes *a* (being heated therein) into the space above the furnace below the deflectors O. These deflectors will diffuse the heated air in such a manner that, after passing between them and the inclined plates Q, it will be spread through the whole of the space above the deflectors O and inclined plates P and under the floor D, and hence through the malt spread on this floor. After the malt has been suitably cured it may be dumped onto the deflectors O and inclined plates P, as stated above, and it will slide into the troughs formed by the plates P and plates Q. The malt may then be drawn from these troughs into the troughs S at will by means of the spouts R, and by means of the screw-conveyers carried thence through openings in the wall B to suitable places of deposit.

By means of the apparatus described the heat will be very economically used and evenly distributed through the malt, and no smoke or dust will reach the malt, the heated air being free from the same. The apparatus also facilitates moving the malt and other manipulations pertaining to the curing process.

I claim as my invention—

1. The combination, in an apparatus for drying malt, of the deflectors O, inclined plates P and Q, and troughs S, having the screw-conveyers, substantially as specified.

2. The combination of the perforated drying-floor D, having pivoted or hinged sections, deflectors O, inclined plates P and Q, and troughs S, substantially as described.

3. In an apparatus for drying malt, and in combination with the deflectors O and inclined plates P and Q, a furnace embodying a combination of these elements, namely: a combustion-chamber, F, one or more flues, I, having vertical tubes $a$, top plate, H, one or more plates, L, openings M, and the double walls G, J, and K, having the air-spaces $c$, substantially as and for the purposes set forth.

GOTTLIEB F. BURKHARDT.

Witnesses:
   EDW. DUMMER,
   CHAS. H. GUILD.